US011895481B2

(12) United States Patent
Kajimoto et al.

(10) Patent No.: US 11,895,481 B2
(45) Date of Patent: Feb. 6, 2024

(54) SOUND CONTROL APPARATUS AND SOUND CONTROL METHOD

(71) Applicant: DENSO TEN Limited, Kobe (JP)

(72) Inventors: Nobuaki Kajimoto, Kobe (JP); Shizuka Ishigaki, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/697,047

(22) Filed: Mar. 17, 2022

(65) Prior Publication Data

US 2023/0209292 A1 Jun. 29, 2023

(30) Foreign Application Priority Data

Dec. 24, 2021 (JP) ................................. 2021-210659

(51) Int. Cl.

| | |
|---|---|
| ***H04S 7/00*** | (2006.01) |
| ***H04R 1/32*** | (2006.01) |
| ***H04R 3/12*** | (2006.01) |
| ***H04R 5/02*** | (2006.01) |

(52) U.S. Cl.

CPC ............ *H04S 7/302* (2013.01); *H04R 1/323* (2013.01); *H04R 3/12* (2013.01); *H04R 5/02* (2013.01); *H04R 2499/13* (2013.01)

(58) Field of Classification Search

None

See application file for complete search history.

(56) References Cited

U.S. PATENT DOCUMENTS 6,724,317 B1 * 4/2004 Kitano ................ B60R 11/0235 340/461
7,509,192 B2 * 3/2009 Fukuro ................ H03K 19/177 296/37.16
7,773,075 B2 * 8/2010 Otsuka ............... G01C 21/3664 345/173
9,503,801 B2 * 11/2016 Nagami ................... H04R 1/10
2001/0022553 A1 * 9/2001 Pala ........................ B60R 11/04 340/901
2012/0045072 A1 * 2/2012 Matsuda ................ H04R 1/345 381/86
2021/0237660 A1 * 8/2021 Iwase .................. B60R 11/0235

FOREIGN PATENT DOCUMENTS

JP 2009-017094 A 1/2009
JP 2017-222276 A 12/2017

* cited by examiner

*Primary Examiner* — Paul W Huber

(74) *Attorney, Agent, or Firm* — Oliff PLC

(57) ABSTRACT

A sound control apparatus includes: a display panel that is supported by a base provided in a vehicle in a manner in which an angle of the display panel relative to the base is variable; an angle detector configured to detect the angle; and a controller configured to change sound setting in a cabin of the vehicle in accordance with the angle.

11 Claims, 8 Drawing Sheets

SOUND CONTROL APPARATUS AND SOUND CONTROL METHOD

CROSS-REFERENCE TO RELATED APPLICATIONS

This application is based upon and claims the benefit of priority from prior Japanese patent application No. 2021-210659, filed on Dec. 24, 2021, the entire contents of which are incorporated herein by reference.

TECHNICAL FIELD

The present invention relates to a sound control apparatus and a sound control method.

BACKGROUND ART

An in-vehicle sound and video device serving as an example of a sound control apparatus includes a rear seat entertainment system (RES) for enjoying a video such as a TV and a DVD at a rear seat in a vehicle cabin and the rear seat entertainment system is independent of an entertainment system provided at a front seat (see, for example, JP-A-2017-222276). The RES includes, for example, a foldable display device provided with a base installed on a ceiling portion of a vehicle and a display panel supported by the base in a manner in which the display panel is inclined relative to the base.

SUMMARY OF INVENTION

A foldable display device is provided with a speaker in a display panel and a person can listen to a sound without using a speaker or a headphone installed in a vehicle. However, in this kind of display device, for example, when three rows of seats are provided in a vehicle cabin, an inclination angle of the display panel is different between the second-row seats and the third-row seats among rear seats. Therefore, a passenger in a second-row seat and a passenger in a third-row seat listen to different sounds even when sounds having the same quality are output from the speaker.

An inclination angle for a second-row seat is an angle at which the display panel directly faces an average height of heads of passengers in the second-row seats. That is, the inclination angle for the second-row seat is an angle at which a line extending in a normal direction from the center of the display panel in a plan view when the vehicle is viewed from a side passes through positions of the heads of the passengers in the second-row seats. However, the inclination angle for the second-row seat does not need to completely coincide with the angle at which the display panel directly faces the average height of the heads of the passengers in the second-row seats. The inclination angle for the second-row seat may be deviated from the angle at which the display panel directly faces the average height of the heads of the passengers in the second-row seats within a certain range (for example, about ±20°). An inclination angle for a third-row seat is an angle at which the display panel directly faces an average height of heads of passengers in the third-row seats. That is, the inclination angle for the third-row seat is an angle at which a line extending in a normal direction from the center of the display panel in a plan view when the vehicle is viewed from a side passes through positions of the heads of the passengers in the third-row seats. However, the inclination angle for the third-row seat does not need to completely coincide with the angle at which the display panel directly faces the average height of the heads of the passengers in the third-row seats. The inclination angle for the third-row seat may be deviated from the angle at which the display panel directly faces the average height of the heads of the passengers in the third-row seats within a certain range (for example, about ±20°).

An aspect of the present disclosure relates to providing a passenger with a sound having appropriate quality by reducing an influence of an angle of a display panel.

According to an aspect of the present disclosure, there is provided a sound control apparatus including: a display panel that is supported by a base provided in a vehicle in a manner in which an angle of the display panel relative to the base is variable; an angle detector configured to detect the angle; and a controller configured to change sound setting in a cabin of the vehicle in accordance with the angle.

According to the sound control apparatus of the present disclosure, it is possible to provide a passenger with a sound having appropriate quality by reducing an influence of an angle of a display panel.

DESCRIPTION OF EMBODIMENTS

Hereinafter, a sound control apparatus and a sound control method according to the present disclosure will be described with reference to the drawings.

Embodiment (System Configuration)

Figure 1:
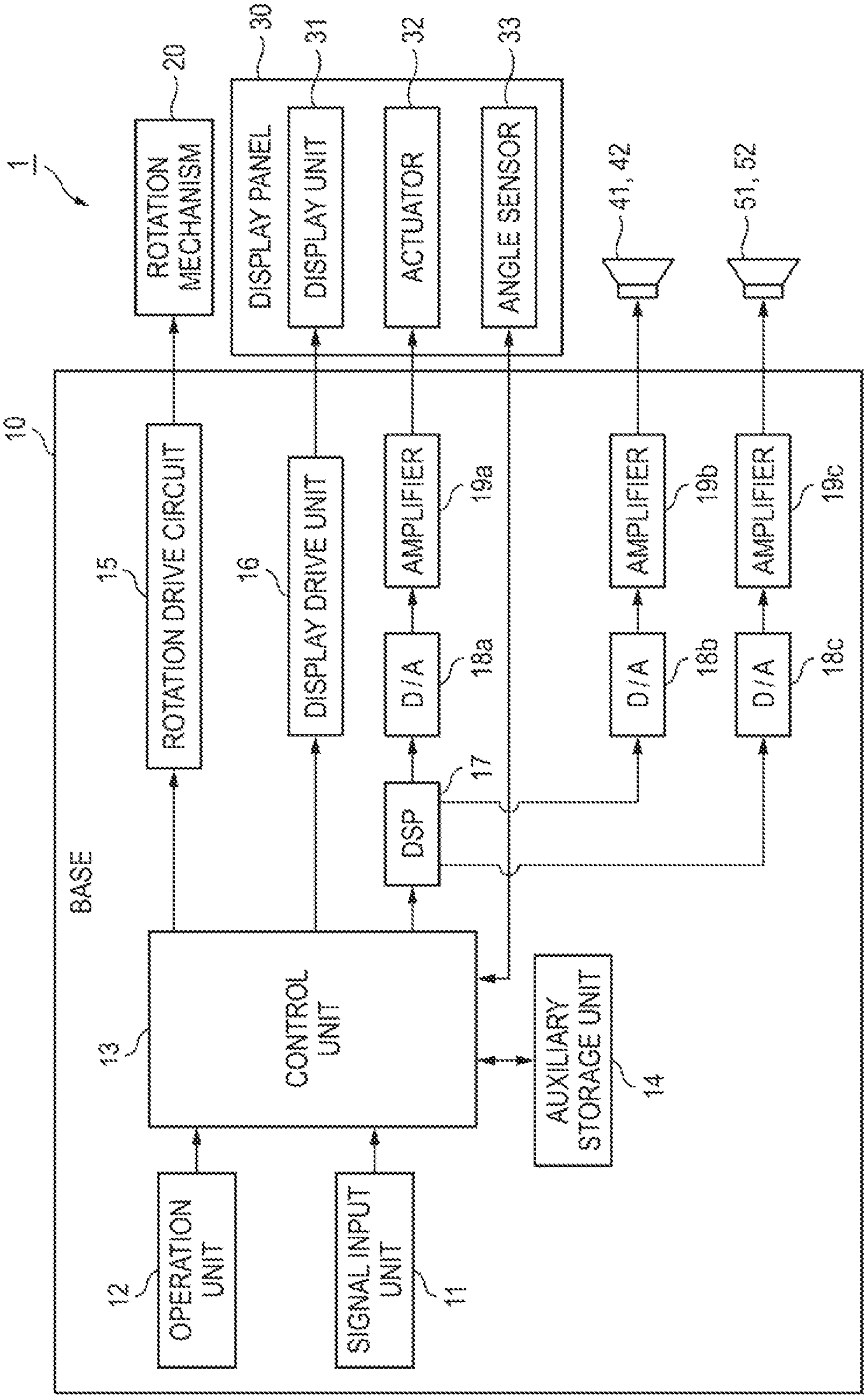
FIG. 1 is a diagram showing a configuration of an in-vehicle sound display device serving as an example of a sound control apparatus according to an embodiment.
Figure 2:
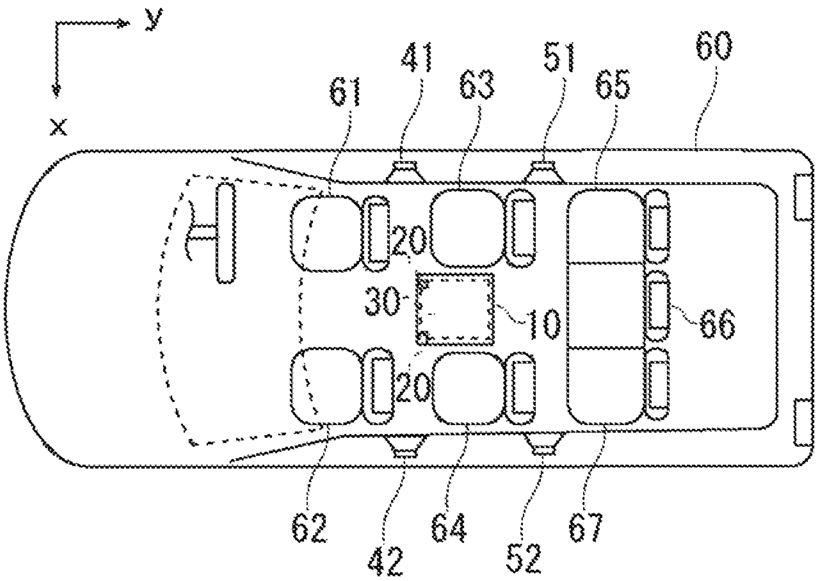
FIG. 2 is a view showing an arrangement of each part of the in-vehicle sound display device in a vehicle.

FIG. 1 is a diagram showing a configuration of an in-vehicle sound display device serving as an example of a sound control apparatus according to an embodiment. FIG. 2 is a view showing an arrangement of each part of the in-vehicle sound display device in a vehicle.

The in-vehicle sound display device 1 is, for example, a device called RSE mounted in a vehicle 60. The RSE provides contents such as a video and a sound reproduced from a medium such as a television broadcast or a digital versatile disc (DVD) to a passenger in a rear seat of a vehicle cabin. Such contents are provided from an external device to the RSE. The external device is, for example, a navigation device mounted in the vehicle 60. Alternatively, the external device may be a smartphone or a tablet terminal of a passenger.

In the present embodiment, the vehicle 60 is, for example, a minivan of seven persons, and includes three rows of seats 61 to 67 arranged in a front-rear direction (y direction shown in FIG. 2) of the vehicle 60 in the vehicle cabin. Among the seats 61 to 67, the first-row seats 61 and 62 are front seats, and the second-row seats 63 and 64 and the third-row seats 65 to 67 are rear seats. The first-row seats 61 and 62 are arranged side by side in a left-right direction (x direction shown in FIG. 2) of the vehicle 60 that is orthogonal to the front-rear direction. The second-row seats 63 and 64 and the third-row seats 65 to 67 are also arranged side by side in the left-right direction.

The in-vehicle sound display device 1 includes a base 10, a rotation mechanism 20, a display panel 30, second-row seat speakers 41 and 42, and third-row seat speakers 51 and 52.

A combination of the base 10, the rotation mechanism 20, and the display panel 30 in the in-vehicle sound display device 1 is a display device for providing a video to a passenger in a rear seat. As shown in FIG. 2, the display device is disposed between the first-row seats 61 and 62 and the second-row seats 63 and 64 in the front-rear direction and between the seat 63 and the seat 64 in the left-right direction. The base 10, the rotation mechanism 20, and the display panel 30 are installed on a ceiling portion of an upper portion in the vehicle cabin in an upper-lower direction of the vehicle 60 (see z direction in FIGS. 7A to 9B) that is orthogonal to the front-rear direction and the left-right direction.

Figure 3:
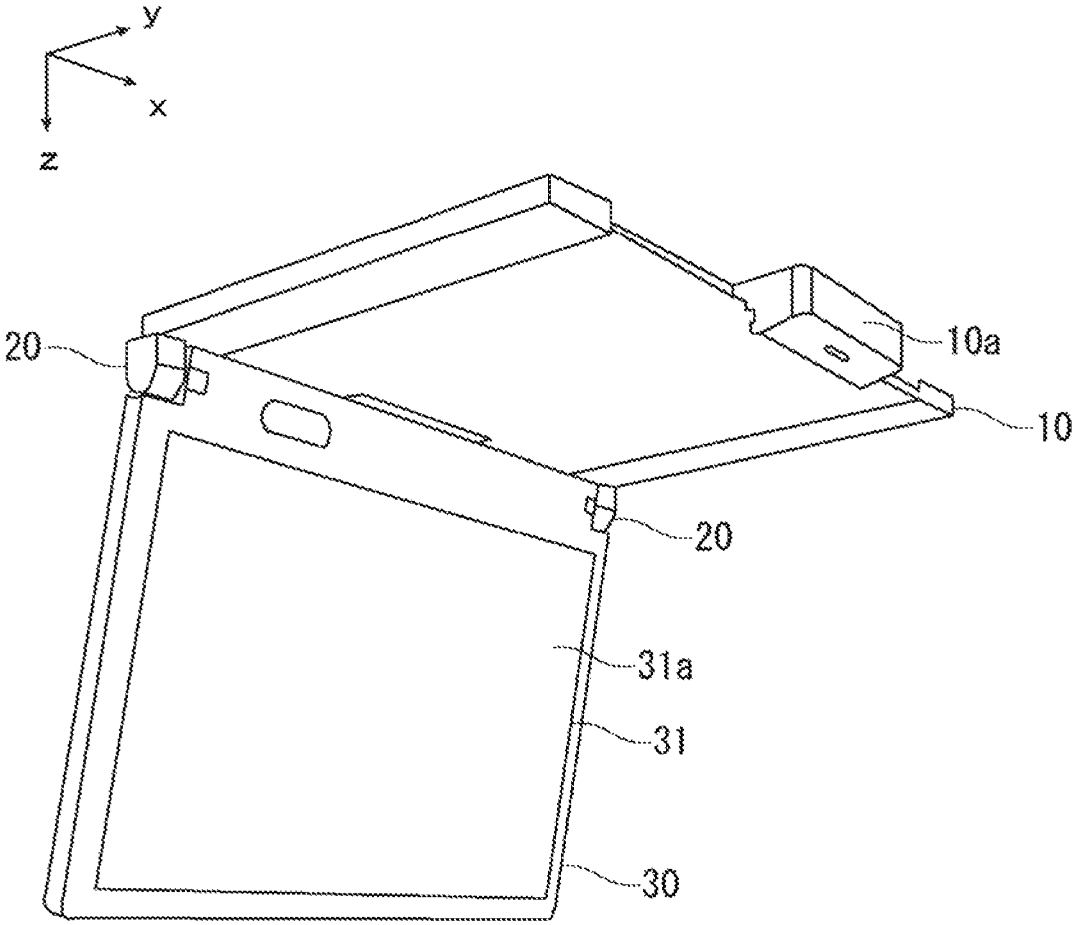
FIG. 3 is a view showing an appearance of a base, a rotation mechanism, and a display panel of the in-vehicle sound display device.

FIG. 3 is a view showing an appearance of the base 10, the rotation mechanism 20, and the display panel 30 of the in-vehicle sound display device 1. FIG. 3 shows a state in which the display panel 30 is opened relative to the base 10.

The base 10 supports the display panel 30, and has a substantially rectangular parallelepiped housing. The housing of the base 10 is fixed to the ceiling portion in the vehicle cabin. An electronic device or the like for driving the display panel 30, which will be described later, is provided in the housing of the base 10. The base 10 has a width direction (x direction in FIG. 3) that coincides with the left-right direction of the vehicle 60, a depth direction (y direction in FIG. 3) that coincides with the front-rear direction of the vehicle 60, and a thickness direction (z direction in FIG. 3) that is orthogonal to the width direction and the depth direction and coincides with the upper-lower direction of the vehicle 60. A lock 10*a* for holding the display panel 30 when the display panel 30 is closed relative to the base 10 is provided at one end portion in the depth direction and a central portion in the width direction of the base 10. The rotation mechanism 20 is provided as a part of the base at the other end portion in the depth direction and each of both end portions in the width direction of the base 10.

The rotation mechanism 20 rotates the display panel 30, and includes a rotation shaft, a drive motor, various gears, a clutch, and the like. The rotation mechanism 20 supports the display panel 30 in a manner of sandwiching the display panel 30 in the width direction of the base 10. The rotation mechanism 20 rotates each part of the display panel 30 in y-z plane in FIG. 3 around the rotation shaft extending in the width direction of the base 10. As a result, it is possible to change the display panel 30 from a state in which the display panel 30 overlaps the base 10 and is closed relative to the base 10 to a state in which the display panel 30 is inclined in a rear seat direction in the vehicle cabin or is inclined to a lower side of the base 10 and is opened relative to the base 10 as shown in FIG. 3. That is, an angle of the display panel 30 relative to the base 10 can be changed. Therefore, it can be said that the display panel 30 is supported by the base 10 in a manner in which an angle of the display panel 30 relative to the base 10 can be changed by the rotation mechanism 20.

The state in which the display panel 30 is closed can be regarded as a state in which the display device is folded. Therefore, a combination of the base 10, the rotation mechanism 20, and the display panel 30 can be regarded as a foldable display device. In addition, since the combination of the base 10, the rotation mechanism 20, and the display panel 30 is suspended from the ceiling portion in the vehicle cabin, it can be said that the combination of the base 10, the rotation mechanism 20, and the display panel 30 is a suspended display device.

The display panel 30 includes a substantially rectangular parallelepiped housing and a display unit 31 incorporated in the housing, such as an organic electroluminescent display (OELD, organic EL display) or a liquid crystal display (LCD). A display surface 31*a* of the display unit 31 faces the base 10 (the ceiling of the vehicle 60) in a state in which the display panel 30 is closed, and faces a passenger in a rear seat of the vehicle 60 in a state in which the display panel 30 is opened (see FIGS. 7B and 7C).

Further, the display panel 30 includes an actuator 32 as shown in FIG. 1. The actuator 32 outputs a sound by vibrating the display unit 31, and is disposed at a side opposite to the display surface 31*a* of the display unit 31 in the housing of the display panel 30. For example, the actuator 32 is fixed to a surface opposite to the display surface 31*a* by an adhesive. The actuator 32 is, for example, a piezoelectric element. Alternatively, the actuator 32 may be a vibration element such as a solenoid. In the present embodiment, the actuator 32 and the display unit 31 forms a display panel speaker of the display panel 30. The display panel speaker is an example of a first speaker.

The display panel 30 includes an angle sensor 33. The angle sensor 33 detects an angle of the display panel 30 relative to the base 10, and is disposed in the housing of the display panel 30. The angle sensor 33 is, for example, a gyro sensor (rotary mechanical acceleration sensor). Alternatively, the angle sensor 33 may be a vibration type acceleration sensor. The angle sensor 33 may be a rotary encoder. The angle sensor 33 outputs a detection signal indicating a detected angle of the display panel 30 to a control unit 13 to be described later. The angle sensor 33 is an example of an angle detector.

In the in-vehicle sound display device 1, the second-row seat speakers 41 and 42 are speakers for mainly providing a sound to passenger in the second-row seats 63 and 64. As shown in FIG. 2, the second-row seat speakers 41 and 42 are installed at side portions in the vehicle cabin in the vicinity of the second-row seats 63 and 64. Specifically, the second-row seat speakers 41 and 42 are disposed between the first-row seats 61 and 62 and the second-row seats 63 and 64 in the front-rear direction of the vehicle 60, and are disposed in the vehicle cabin at a right side of the right-side seat 63 and a left side of the left-side seat 64 in the left-right direction. Further, the third-row seat speakers 51 and 52 are speakers for mainly providing a sound to passengers in the third-row seats 65 to 67. The third-row seat speakers 51 and 52 are installed at side portions in the vehicle cabin in the vicinity of the third-row seats 65 and 67. Specifically, the third-row seat speakers 51 and 52 are disposed between the second-row seats 63 and 64 and the third-row seats 65 to 67 in the front-rear direction, and are disposed at a right side of the right-side seat 65 and a left side of the left-side seat 67 in the left-right direction in the vehicle cabin. Hereinafter, the second-row seat speakers 41 and 42 and the third-row seat speakers 51 and 52 are also collectively referred to as vehicle speakers. The vehicle speaker is an example of a second speaker different from the first speaker.

Next, an electronic device and the like that is provided in the housing of the base 10 and is used for driving the display panel 30 will be described with reference to FIG. 1. A signal input unit 11, an operation unit 12, a control unit 13, an auxiliary storage unit 14, a rotation drive circuit 15, a display drive circuit 16, a digital signal processor (DSP) 17, D/A converters 18*a* to 18*c*, and amplifiers 19*a* to 19*c* are provided in the housing of the base 10.

The signal input unit 11 inputs a video signal, a sound signal, and the like of contents output from an external device such as a navigation device, and outputs the video signal, the sound signal, and the like to the control unit 13. The signal input unit 11 is an input terminal into which a cable such as a high-definition multimedia interface (HDMI: registered trademark) or a universal serial bus (USB) is inserted.

The operation unit 12 recognizes an input operation performed by a user on the in-vehicle sound display device 1, and outputs a signal corresponding to the input operation to the control unit 13. The input operation includes, for example, turning on or turning off a power supply of the in-vehicle sound display device 1, setting a posture of the display panel 30 (an angle of the display panel 30 relative to the base 10) including opening and closing, switching contents to be output to the display panel 30, adjusting image quality, adjusting a sound volume, and the like. The operation unit 12 is, for example, a remote controller, an input button, an input lever, a touch panel, or a combination of a remote controller, an input button, an input lever, and a touch panel.

The control unit 13 includes, for example, a central processing unit (CPU) and a main storage unit. The CPU executes a computer program loaded in the main storage unit so that the CPU can execute the computer program, and provides functions of the in-vehicle sound display device 1. The main storage unit stores a computer program to be executed by the CPU, data to be processed by the CPU, and the like. The CPU is also called a processor. The CPU is not limited to a single processor, and may have a multiprocessor configuration. In addition, the CPU may be a single processor connected by a single socket, and may have a multi-core configuration. Through these processings, the control unit 13 receives an operation from a user who is a passenger via the operation unit 12, and provides various functions to the user in accordance with the operation from the user. For example, when the control unit 13 receives an operation related to a posture of the display panel 30 from the user via the operation unit 12, the control unit 13 outputs a rotation command signal related to the posture of the display panel 30 to the rotation drive circuit 15. When the control unit 13 receives an operation related to switching of contents from the user, the control unit 13 outputs a video signal of the contents after the switching to the display drive circuit 16 and outputs a sound signal of the contents to the DSP 17.

The control unit 13 receives an angle of the display panel 30 detected by the angle sensor 33, and changes sound setting of a sound signal to be output to the display panel speaker and the vehicle speaker in accordance with the angle. When the control unit 13 changes the sound setting, the control unit 13 generates a change signal including an appropriate value of the sound setting corresponding to the angle of the display panel 30 based on a table of the sound setting stored in the auxiliary storage unit 14 to be described later, and outputs the change signal to the DSP 17.

The auxiliary storage unit 14 stores various parameters related to a posture of the display panel 30, a sound output, and the like. For example, the auxiliary storage unit 14 stores a value of a standard angle of the display panel 30 relative to the base 10 for the second-row seats 63 and 64 and a value of a standard angle of the display panel 30 relative to the base 10 for the third-row seats 65 to 67.

Here, the standard angle for the second-row seats 63 and 64 is an angle (for example, 90°+20°) at which the display panel 30 directly faces an average height of the heads of passengers in the second-row seats 63 and 64. That is, the angle for the second-row seats 63 and 64 is an angle at which a line extending in the normal direction from the center of the display panel in a plan view when the vehicle 60 is viewed from a side passes through positions of the heads of the passengers in the second-row seats 63 and 64. However, the angle for the second-row seats 63 and 64 does not need to completely coincide with the angle at which the display panel 30 directly faces the average height of the heads of the passengers in the second-row seats 63 and 64. The angle for the second-row seats 63 and 64 may be deviated from the angle at which the display panel 30 directly faces the average height of the heads of the passengers in the second-row seats 63 and 64 within a certain range (for example, about ±20°). The standard angle for the third-row seats 65 to 67 is an angle (for example, 90°) at which the display panel 30 directly faces an average height of the heads of passengers in the third-row seats 65 to 67. That is, the angle for the third-row seats 65 to 67 is an angle at which a line extending in the normal direction from the center of the display panel 30 in plan view when the vehicle 60 is viewed from a side passes through positions of the heads of the passengers in the third-row seats 65 to 67. However, the angle for the third-row seats 65 to 67 does not need to completely coincide with the angle at which the display panel 30 directly faces the average height of the heads of the passengers in the third-row seats 65 to 67. The angle for the third-row seats 65 to 67 may be deviated from the angle at which the display panel 30 directly faces the average height of the heads of the passengers in the third-row seats 65 to 67 within a certain range (for example, about ±20°).

For each of the display panel speaker and the vehicle speaker, the auxiliary storage unit 14 stores a table in which an appropriate value of sound setting for an angle of the display panel 30 is tabulated for each predetermined angle (for example, 5°) of the display panel 30. The sound setting is setting of a gain, a phase, a delay amount, and a frequency characteristic of a sound output from each of the display panel speaker and the vehicle speaker. The appropriate value of the sound setting is, for example, a value determined based on a result of a sound in the vehicle cabin measured for each vehicle type. Here, for example, a case where a support shaft (also referred to as a hinge) for opening and closing the display panel 30 is provided at a front side of the vehicle 60 in the base 10 will be described. For example, for an appropriate value of the gain, when an angle of the display panel 30 relative to the base 10 is close to an angle (for example, 90°) for the third-row seats 65 to 67, a value of a gain of a sound signal to be output to the display panel speaker is large. Further, when an angle of the display panel 30 changes from the angle for the third-row seats 65 to 67 to an angle close to an angle (for example, 90°+20°) for the second-row seats 63 and 64, a value of a gain of a sound signal to be output to the display panel speaker is small as the display panel 30 is opened. When an angle of the display panel 30 is close to the angle for the third-row seats 65 to 67, a value of a gain of a sound signal to be output to the third-row seat speakers 51 and 52 is large. Further, when an angle of the display panel 30 changes from the angle for the third-row seats 65 to 67 to an angle close to the angle for the second-row seats 63 and 64, a value of a gain of a sound signal to be output to the second-row seat speakers 41 and 42 is large as the display panel 30 is opened. The auxiliary storage unit 14 is, for example, a flash memory. Alternatively, the auxiliary storage unit 14 may be a general nonvolatile memory called an electrically erasable programmable read-only memory (EEPROM).

When the rotation drive circuit 15 receives a rotation command signal from the control unit 13, the rotation drive circuit 15 generates a command value related to the rotation of the display panel 30 based on the rotation command signal. The rotation drive circuit 15 includes an amplifier. The rotation drive circuits 15 amplifies the command value via the amplifier, generates a rotation drive signal, and outputs the rotation drive signal to the rotation mechanism 20. As a result, the rotation mechanism 20 rotates the display panel 30 to a posture in accordance with a user operation related to the posture of the display panel 30.

The display drive circuit 16 receives a video signal from the control unit 13, generates a display drive signal for driving the display unit 31 of the display panel 30 based on the video signal, and outputs the display drive signal to the display unit 31. As a result, the display unit 31 displays a video.

The DSP 17 receives a sound signal from the control unit 13 and executes a predetermined processing on the sound signal (see, for example, JP-A-2009-17094).

Figure 4:
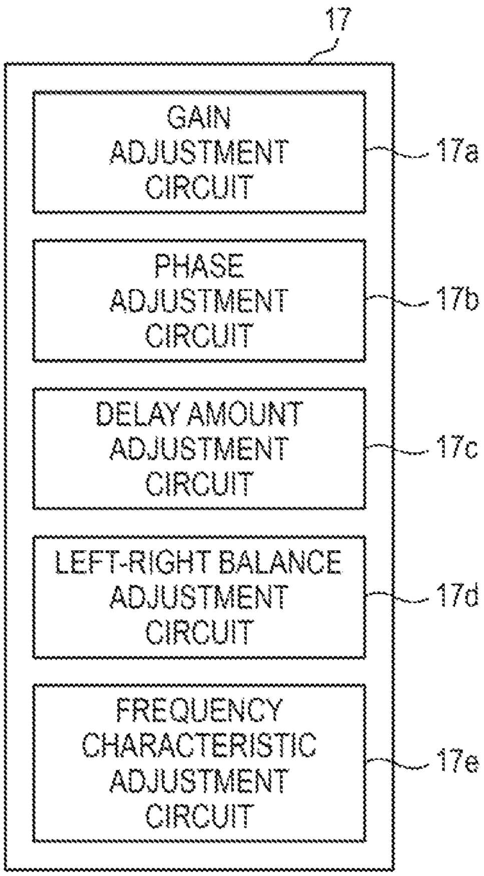
FIG. 4 is a diagram showing a detailed configuration of a DSP.

FIG. 4 is a diagram showing a detailed configuration of the DSP 17. As shown in FIG. 4, the DSP 17 includes a gain adjustment circuit 17*a*, a phase adjustment circuit 17*b*, a delay amount adjustment circuit 17*c*, a left-right balance adjustment circuit 17*d*, and a frequency characteristic adjustment circuit 17*e*. The gain adjustment circuit 17*a* adjusts a gain of a sound output from each of the display panel speaker and the vehicle speaker. The phase adjustment circuit 17*b* adjusts a phase of a sound output from each of the display panel speaker and the vehicle speaker. The delay amount adjustment circuit 17*c* adjusts a delay amount of a sound output from each of the display panel speaker and the vehicle speaker. The left-right balance adjustment circuit 17*d* adjusts a left-right balance of a sound output from each of the display panel speaker and the vehicle speaker. The frequency characteristic adjustment circuit 17*e* adjusts a frequency characteristic of a sound output from each of the display panel speaker and the vehicle speaker. The DSP 17 causes the adjustment circuits 17*a* to 17*e* to execute a predetermined sound adjustment processing on a sound signal and generates a sound processing signal, and outputs the sound processing signal to the D/A converters 18*a* to 18*c*. In addition to the adjustment circuits 17*a* to 17*e*, the DSP 17 may include a finite impulse response (FIR) filter that executes a filter processing, and an addition circuit that adds divided sound signals for executing various processings.

When the DSP 17 receives a change signal from the control unit 13, the DSP 17 executes sound setting of a sound signal based on an appropriate value of the sound setting included in the change signal, generates a sound processing signal, and outputs the sound processing signal to the D/A converters 18*a* to 18*c*.

The D/A converters 18*a* to 18*c* convert the sound processing signal that is a digital signal into an analog signal, and output the analog signal to the amplifiers 19*a* to 19*c*. The amplifier 19*a* amplifies the analog signal, generates an actuator drive signal, and outputs the actuator drive signal to the actuator 32. The actuator 32 drives the display unit 31 in response to the actuator drive signal and vibrates the display unit 31. As a result, a sound is output from the display unit 31. The amplifier 19*b* amplifies the analog signal and outputs the amplified analog signal to the second-row seat speakers 41 and 42. As a result, sounds are output from the second-row seat speakers 41 and 42. The amplifier 19*c* amplifies the analog signal and outputs the amplified analog signal to the third-row seat speakers 51 and 52. As a result, sounds are output from the third-row seat speakers 51 and 52.

(Processing Flow)

Figure 5:
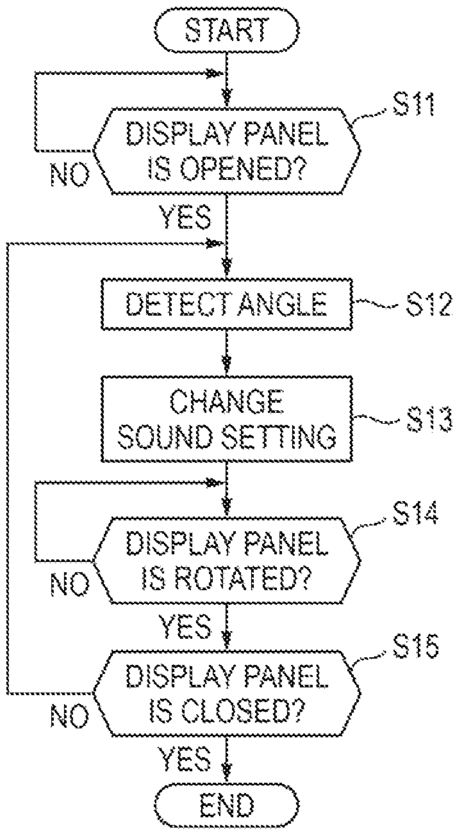
FIG. 5 is a flowchart showing a processing of the in-vehicle sound display device according to an embodiment.
Figure 6A:
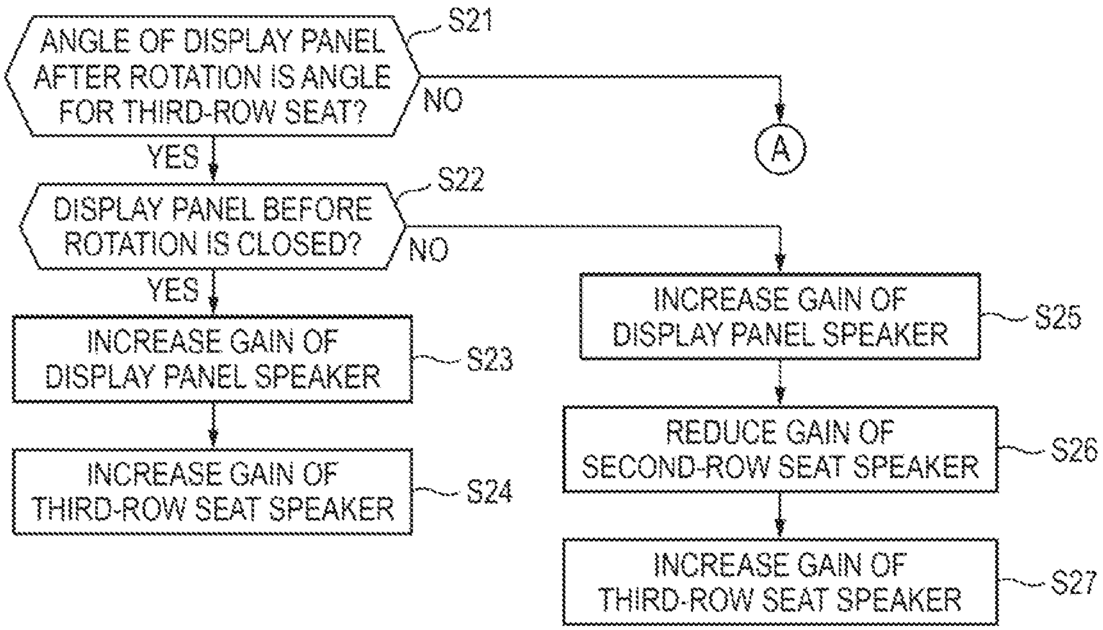
FIGS. 6A and 6B are flowcharts showing details of a processing in a sound setting change step.
Figure 6B:
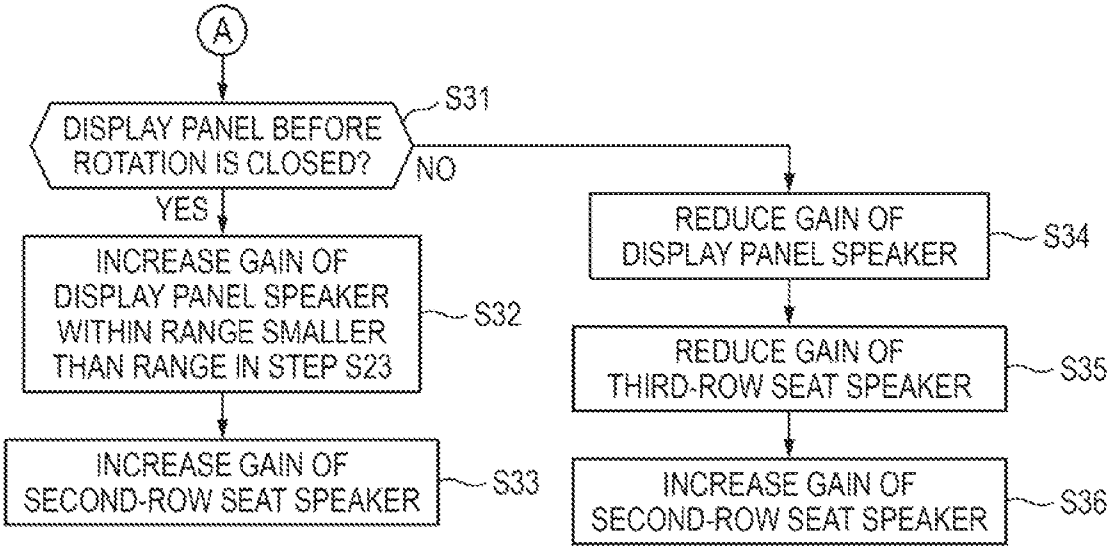

FIG. 5 is a flowchart showing a processing of the in-vehicle sound display device 1 according to the present embodiment. FIGS. 6A and 6B are flowcharts showing details of the processing in a sound setting change step. These processings are executed by the control unit 13.

In a processing of S11, when the display panel 30 is closed relative to the base 10, the control unit 13 first determines whether the display panel 30 is opened (S11). Specifically, the control unit 13 unlocks the lock 10*a* of the base 10 when the control unit 13 receives an operation related to a posture of the display panel 30 from a user via the operation unit 12. When the control unit 13 detects that the lock 10*a* is unlocked, the control unit 13 determines that the display panel 30 is opened.

The control unit 13 outputs a rotation command signal related to a posture of the display panel 30 to the rotation drive circuit IS. When the rotation drive circuit 15 receives the rotation command signal from the control unit 13, the rotation drive circuit 15 generates a rotation drive signal based on the rotation command signal and outputs the rotation drive signal to the rotation mechanism 20. When the rotation mechanism 20 receives the rotation drive signal from the rotation drive circuit 15, the rotation mechanism 20 rotates the display panel 30 to a posture corresponding to the operation related to the posture of the display panel 30 based on the rotation drive signal.

When it is determined in SI that the display panel 30 is opened (YES), the control unit 13 detects that the rotation of the display panel 30 is stopped, thereafter the control unit 13 receives a detection signal from the angle sensor 33 and detects an angle of the display panel 30 relative to the base 10 (S12).

Subsequently, the control unit 13 changes sound setting of a sound signal to be output to each of the display panel speaker and the vehicle speaker in accordance with the angle of the display panel 30 (S3). Details of the sound setting change processing will be described later.

After the sound setting is changed, the control unit 13 determines whether the display panel 30 is rotated (S14). Specifically, when the control unit 13 receives an operation related to a posture of the display panel 30 from the user via the operation unit 12, the control unit 13 outputs a rotation command signal related to a posture of the display panel 30 to the rotation drive circuit 15 in a similar manner to the processing in S11. As a result, the rotation mechanism 20 rotates the display panel 30 to a posture corresponding to the operation related to the posture of the display panel 30. As a result, the control unit 13 determines that the display panel 30 is rotated.

When it is determined in S14 that the display panel 30 is rotated (YES), the control unit 13 determines whether the display panel 30 is closed after the control unit 13 detects that the rotation of the display panel 30 is stopped (S15). Specifically, when the control unit 13 detects that the display panel 30 is closed and the lock 10*a* of the base 10 is locked, the control unit 13 determines that the display panel 30 is closed.

When it is determined in S15 that the display panel 30 is not closed (NO), the processing proceeds to S12, and the control unit 13 receives a detection signal from the angle sensor 33 and detects an angle of the display panel 30 relative to the base 10. Then, the control unit 13 changes sound setting of a sound signal to be output to each of the display panel speaker and the vehicle speaker in accordance with the angle of the display panel 30 (S13).

On the other hand, when it is determined in S15 that the display panel 30 is closed (YES), the control unit 13 ends the sound setting change processing.

Figure 7A:
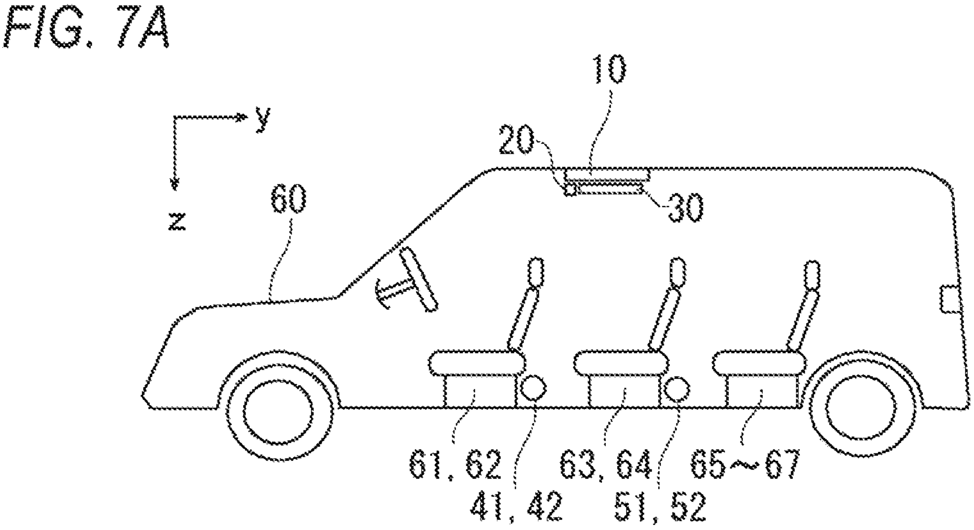
FIGS. 7A to 7C are views showing an example (part 1) of rotation of a display panel 30.
Figure 7B:
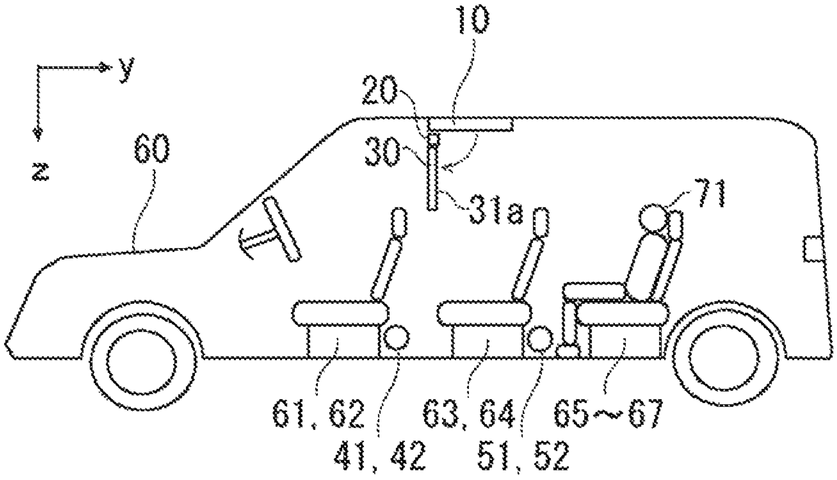
Figure 7C:
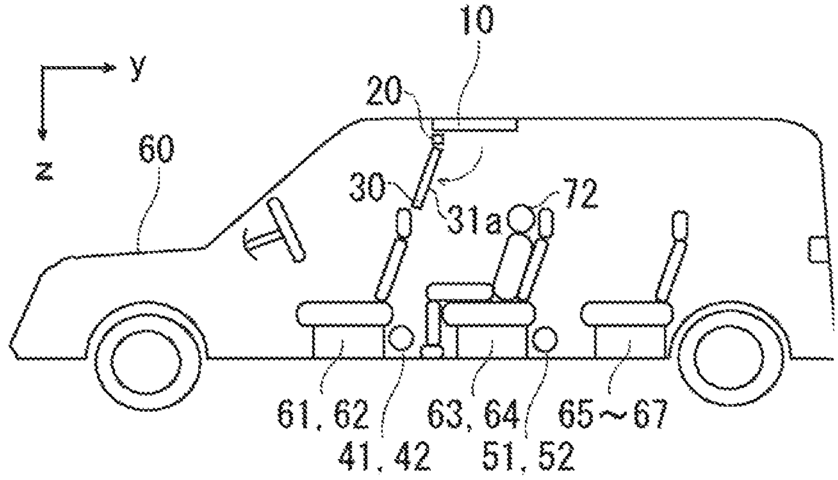
Figure 8A:
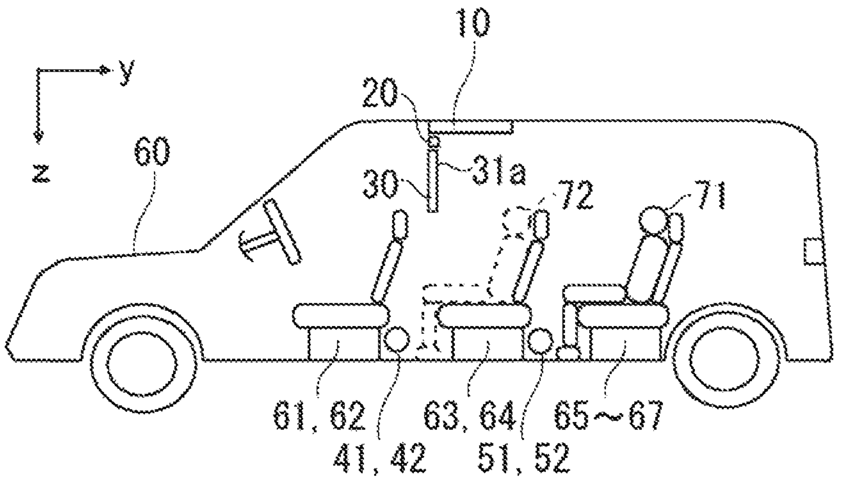
FIGS. 8A and 8B are views showing an example (part 2) of the rotation of the display panel 30.
Figure 8B:
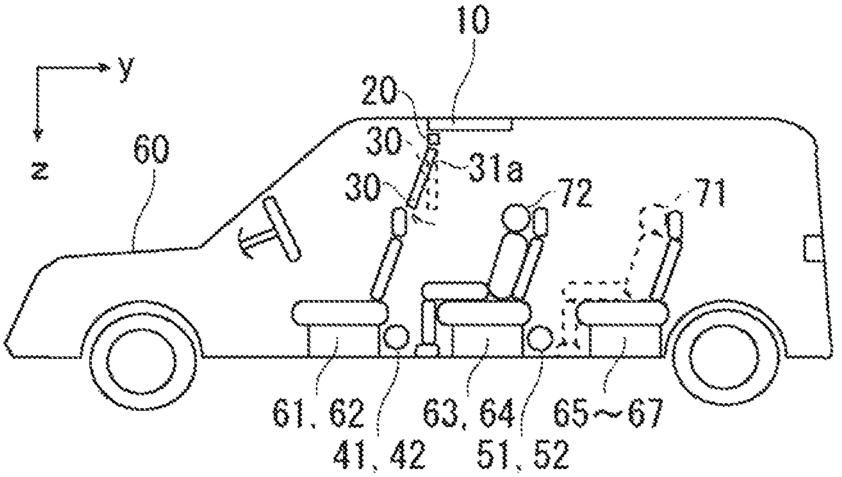
Figure 9A:
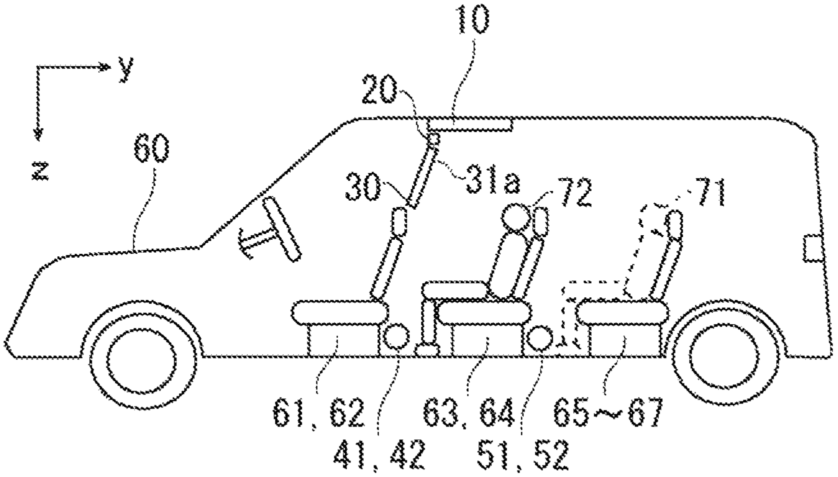
FIGS. 9A and 9B are views showing an example (part 3) of the rotation of the display panel 30.
Figure 9B:
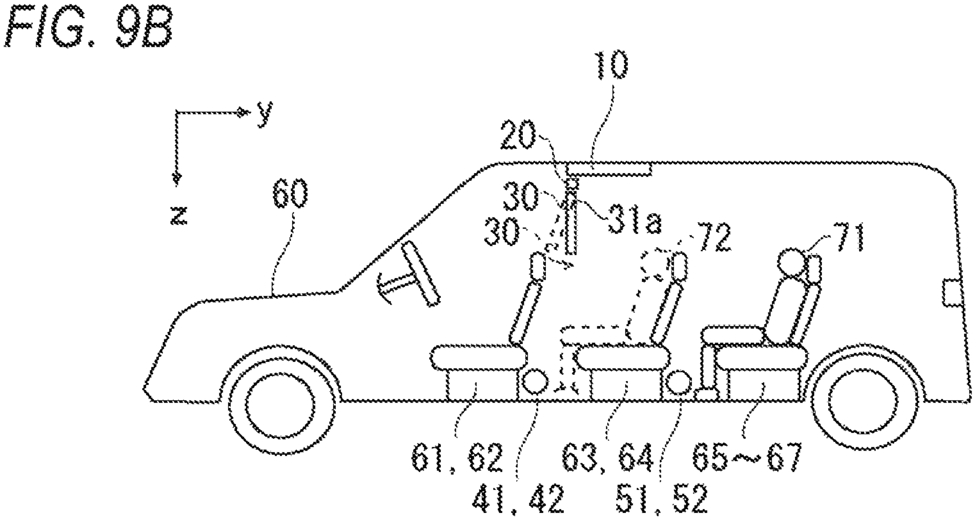

Next, details of the sound setting change processing in S13 will be described with reference to FIGS. 7A to 9B. FIGS. 7A to 98 are views showing examples of the rotation of the display panel 30. FIG. 7A shows a state in which an angle of the display panel 30 relative to the base 10 is substantially equal to 0° and the display panel 30 is closed relative to the base 10. FIG. 7B shows a state in which the display panel 30 is opened and an angle of the display panel 30 relative to the base 10 is an angle (for example, 90°) at which the display panel 30 directly faces the heads of passengers 71 in the third-row seats 65 to 67. That is, FIG. 713 shows a state in which the display panel 30 is at a standard angle (posture) for the third-row seats 65 to 67. The posture of the display panel 30 referred to here is a posture in which the display surface 31*a* faces a rear side of the vehicle 60, and the passengers 71 in the third-ow seats 65 to 67 can easily see a video. FIG. 7C shows a state in which the display panel 30 is further opened and an angle of the display panel 30 relative to the base 10 exceeds the angle for the third-row seats 65 to 67. Specifically, the angle of the display panel 30 is an angle (for example, 90°+20°) at which the display panel 30 directly faces the heads of passengers 72 in the second-row seats 63 and 64. In other words, FIG. 7C shows a state in which the display panel 30 is at a standard angle (posture) for the second-row seats 63 and 64. The posture of the display panel 30 referred to here is a posture in which the display surface 31*a* of the display unit 31 faces obliquely downward, and the passengers 72 of in second-row seats 63 and 64 can easily see a video. FIGS. 8A and 9B show states in which the display panel 30 is in a standard posture for the third-row seats 65 to 67 in a similar manner to that in FIG. 7A. Further, FIGS. 8B and 9A show states in which the display panel 30 is in a standard posture for the second-row seats 63 and 64 in a similar manner to that in FIG. 7B.

In the processing of S21, after an angle of the display panel 30 relative to the base 10 is detected in S12, the control unit 13 first determines whether an angle of the display panel 30 after being rotated is an angle for the third-row seats 65 to 67 as shown in FIG. 6A (S21). Specifically, the control unit 13 compares a value of the detected angle of the display panel 30 with a value of the angle of the display panel 30 for the third-row seats 65 to 67 stored in the auxiliary storage unit 14, and determines whether an angle of the display panel 30 after being rotated is the angle for the third-row seats 65 to 67. When it is determined in S21 that the angle of the display panel 30 after being rotated is not the angle for the third-row seats 65 to 67 (NO), the processing proceeds to S31 in FIG. 6B.

On the other hand, when it is determined in S21 that the angle of the display panel 30 after being rotated is the angle for the third-row seats 65 to 67 (YES), the control unit 13 determines whether the display panel 30 before being rotated is closed (S22). Specifically, the control unit 13 stores an angle of the display panel 30 before being rotated, and determines whether the display panel 30 before being rotated is closed based on the stored angle of the display panel 30.

When it is determined in S22 that the display panel 30 before being rotated is closed (YES), the control unit 13 increases a gain of a sound signal to be output to the display panel speaker (S23). The control unit 13 increases the gain of the sound signal to be output to the display panel speaker when an angle of the display panel 30 relative to the base 10 is close to the angle for the third-row seats 65 to 67. Here, the angle for the third-row seats 65 to 67 is an angle (for example, 90°) at which the display panel 30 directly faces the heads of the passengers 71 in the third-row seats 65 to 67. In this case, the display panel 30 is changed from a closed state as shown in FIG. 7A to an open state as shown in FIG. 7B, and an angle of the display panel 30 is closer to the angle for the third-row seats 65 to 67 than an angle of the display panel 30 before being rotated. Therefore, the control unit 13 increases the gain of the sound signal to be output to the display panel speaker to be larger than a gain before the display panel 30 is rotated. Specifically, based on the table stored in the auxiliary storage unit 14, the control unit 13 changes a value of a gain for the display panel speaker corresponding to an angle of the display panel 30 before being rotated to a value of a gain for the display panel speaker corresponding to an angle of the display panel 30 after being rotated. Then, the control unit 13 generates a change signal including the value of the gain for the display panel speaker corresponding to the angle of the display panel 30 after being rotated, and outputs the change signal to the DSP 17.

As a result, the DSP 17 causes the gain adjustment circuit 17*a* to generate a sound processing signal by increasing a gain of a sound signal based on the value of the gain for the display panel speaker included in the change signal, and outputs the sound processing signal to the D/A converter 18*a*. As a result, a sound having a relatively large volume is output from the display panel speaker (the display unit 31 and the actuator 32). Accordingly, it is possible to provide a sound having an appropriate volume to the passengers 71 in the third-row seats 65 to 67 who are relatively far from the display panel 30.

Subsequently, the control unit 13 increases a gain of a sound signal to be output to the third-row seat speakers 51 and 52 among the vehicle speakers (S24). When an angle of the display panel 30 relative to the base 10 is close to the angle for the third-row seats 65 to 67, the control unit 13 increases the gain of the sound signal to be output to the third-row seat speakers 51 and 52. In this case, since the angle of the display panel 30 is closer to the angle for the third-row seats 65 to 67 than an angle of the display panel 30 before the display panel 30 is rotated, the control unit 13 increases the gain of the sound signal to be output to the third-row seat speakers 51 and 52 to be larger than a gain before the display panel 30 is rotated. Specifically, the control unit 13 adjusts a gain of a sound signal based on the table in the auxiliary storage unit 14. That is, a value of a gain for the third-row seat speakers 51 and 52 corresponding to an angle of the display panel 30 before the display panel 30 is rotated is changed to a value of a gain for the third-row seat speakers 51 and 52 corresponding to an angle of the display panel 30 after the display panel 30 is rotated. Then, the control unit 13 generates a change signal including a value of a gain for the third-row seat speakers 51 and 52 corresponding to an angle of the display panel 30 after the display panel 30 is rotated, and outputs the change signal to the DSP 17.

As a result, the DSP 17 causes the gain adjustment circuit 7*a* to generate a sound processing signal by increasing a gain of a sound signal based on the value of the gain for the third-row seat speakers 51 and 52 included in the change signal, and outputs the sound processing signal to the D/A converter 18*c*. As a result, a sound having a relatively large volume is output from the third-row seat speakers 51 and 52. Accordingly, it is possible to provide a sound having an appropriate volume to the passengers 71 in the third-row seats 65 to 67.

On the other hand, when it is determined in S22 that the display panel 30 before being rotated is not closed (NO), that is, when an angle of the display panel 30 before being rotated is an angle for the second-row seats 63 and 64, the control unit 13 increases a gain of a sound signal to be output to the display panel speaker (S25). Here, the angle for the second-row seats 63 and 64 is an angle (for example, 90°+20°) at which the display panel 30 directly faces the heads of the passengers 72 in the second-row seats 63 and 64. In this case, the display panel 30 is changed from an open state for the second-row seats 63 and 64 as shown in FIG. 9A to an open state for the third-row seats 65 to 67 as shown in FIG. 9B, and an angle of the display panel 30 is closer to the angle for the third-row seats 65 to 67 than an angle of the display panel 30 before the display panel 30 is rotated. Therefore, the control unit 13 increases a gain of a sound signal to be output to the display panel speaker to be larger than a gain before the display panel 30 is rotated. Then, the control unit 13 generates a change signal including a value of a gain for the display panel speaker corresponding to an angle of the display panel 30 after being rotated, and outputs the change signal to the DSP 17.

As a result, the DSP 17 causes the gain adjustment circuit 17*a* to generate a sound processing signal by increasing a gain of a sound signal based on the value of the gain for the display panel speaker included in the change signal, and outputs the sound processing signal to the D/A converter 18*a*. As a result, the display panel speaker outputs a sound having a volume higher than a volume before the display panel is rotated. Accordingly, it is possible to provide a sound having an appropriate volume to the passengers 71 in the third-row seats 65 to 67 who are relatively far from the display panel 30.

Subsequently, the control unit 13 reduces a gain of a sound signal to be output to the second-row seat speakers 41 and 42 among the vehicle speakers (S26). For example, the control unit 13 minimizes the gain of the sound signal to be output to the second-row seat speakers 41 and 42. Then, the control unit 13 generates a change signal including a value of the minimum gain for the second-row seat speakers 41 and 42, and outputs the change signal to the DSP 17.

As a result, the DSP 17 causes the gain adjustment circuit 17*a* to generate a sound processing signal by minimizing a gain of a sound signal based on the value of the gain for the second-row seat speakers 41 and 42 included in the change signal, and outputs the sound processing signal to the D/A converter 18*b*. As a result, almost no sound is output from the second-row seat speakers 41 and 42. Accordingly, even when the passengers 72 sit in the second-row seats 63 and 64, it is possible to prevent the passengers 72 from feeling uncomfortable caused by hearing a sound provided for the passengers 71 in the third-row seats 65 to 67.

Further, the control unit 13 increases a gain of a sound signal to be output to the third-row seat speakers 51 and 52 (S27). Then, the control unit 13 generates a change signal including a value of a gain for the third-row seat speakers 51 and 52 corresponding to an angle of the display panel 30 after the display panel 30 is rotated, and outputs the change signal to the DSP 17.

As a result, the DSP 17 generates a sound processing signal by increasing a gain of a sound signal based on the value of the gain for the third-row seat speakers 51 and 52 included in the change signal, and outputs the sound processing signal to the D/A converter 18*c*. As a result, a sound having a relatively large volume is output from the third-row seat speakers 51 and 52. Accordingly, it is possible to provide a sound having an appropriate volume to the passengers 71 in the third-row seats 65 to 67.

When it is determined in S21 that an angle of the display panel 30 after being rotated is not the angle for the third-row seats 65 to 67 (NO), that is, when an angle of the display panel 30 is the angle for the second-row seats 63 and 64, the control unit 13 determines whether the display panel 30 before being rotated is closed as shown in FIG. 6B (S31).

When it is determined in S31 that the display panel 30 before being rotated is closed (YES), the control unit 13 increases a gain of a sound signal to be output to the display panel speaker within a range smaller than a range in S23 (S32). In this case, the display panel 30 is changed from a closed state as shown in FIG. 7A to an open state for the second-row seats 63 and 64 as shown in FIG. 7C, and an angle of the display panel 30 is closer to the angle for the third-row seats 65 to 67 than an angle of the display panel 30 before being rotated. However, as compared with an open state of the display panel 30 for the third-row seats 65 to 67 as shown in FIG. 7B, an angle of the display panel 30 exceeds the angle for the third-row seats 65 to 67 and the display panel 30 is opened to an angle for the second-row seats 63 and 64. Therefore, the control unit 13 increases a gain of a sound signal to be output to the display panel speaker in a range smaller than the range in S23. Then, the control unit 13 generates a change signal including a value of a gain for the display panel speaker corresponding to an angle of the display panel 30 after being rotated, and outputs the change signal to the DSP 17.

As a result, the DSP 17 causes the gain adjustment circuit 17*a* to generate a sound processing signal by increasing a gain of a sound signal based on the value of the gain for the display panel speaker included in the change signal, and outputs the sound processing signal to the D/A converter 18*a*. As a result, although a volume of a sound is smaller than a volume of a sound output as a result of S23, a sound having a relatively large volume is output from the display panel speaker. Accordingly, it is possible to provide a sound having an appropriate volume to the passengers 72 in the second-row seats 63 and 64 who are relatively close to the display panel 30.

Subsequently, the control unit 13 increases a gain of a sound signal to be output to the second-row seat speakers 41 and 42 (S33). When an angle of the display panel 30 relative to the base 10 is close to an angle for the third-row seats 65 to 67, the control unit 13 increases a gain of a sound signal to be output to the second-row seat speakers 41 and 42. In this case, since the angle of the display panel 30 is closer to the angle for the third-row seats 65 to 67 than an angle of the display panel 30 before the display panel 30 is rotated, the control unit 13 increases the gain of the sound signal to be output to the second-row seat speakers 41 and 42 to be larger than a gain before the display panel 30 is rotated. Specifically, the control unit 13 adjusts a gain of a sound signal based on the table stored in the auxiliary storage unit 14. That is, the control unit 13 changes a value of a gain for the second-row seat speakers 41 and 42 corresponding to an angle of the display panel 30 before is display panel 30 is rotated to a value of a gain for the second-row seat speakers 41 and 42 corresponding to an angle of the display panel 30 after the display panel 30 is rotated. Then, the control unit 13 generates a change signal including a value of a gain for the second-row seat speakers 41 and 42 corresponding to an angle of the display panel 30 after the display panel 30 is rotated, and outputs the change signal to the DSP 17.

As a result, the DSP 17 causes the gain adjustment circuit 17*a* to generate a sound processing signal by increasing a gain of a sound signal based on the value of the gain for the second-row seat speakers 41 and 42 included in the change signal, and outputs the sound processing signal to the D/A converter 18*b*. As a result, a sound having a relatively large volume is output from the second-row seat speakers 41 and 42. Accordingly, it is possible to provide a sound having an appropriate volume to the passengers 72 in the second-row seats 63 and 64.

On the other hand, when it is determined in S31 that the display panel 30 before being rotated is not closed (NO), that is, when an angle of the display panel 30 before being rotated is an angle for the third-row seats 65 to 67, the control unit 13 reduces a gain of a sound signal to be output to the display panel speaker (S34). When an angle of the display panel 30 relative to the base 10 changes from the angle for the third-row seats 65 to 67 to an angle close to the angle for the second-row seats 63 and 64, the control unit 13 reduces a gain of a sound signal to be output to the display panel speaker. In this case, the display panel 30 is changed from an open state for the third-row seats 65 to 67 as shown in FIG. 5A to an open state for the second-row seats 63 and 64 as shown in FIG. 8B. That is, an angle of the display panel 30 exceeds the angle for the third-row seats 65 to 67 as compared with an angle of the display panel 30 before the display panel 30 is rotated, and the display panel 30 is opened to an angle for the second-row seats 63 and 64. Therefore, the control unit 13 reduces a gain of a sound signal to be output to the display panel speaker to be smaller than a gain before the display panel 30 is rotated. Then, the control unit 13 generates a change signal including a value of a gain for the display panel speaker corresponding to an angle of the display panel 30 after being rotated, and outputs the change signal to the DSP 17.

As a result, the DSP 17 causes the gain adjustment circuit 17*a* to generate a sound processing signal by reducing a gain of a sound signal based on the value of the gain for the display panel speaker included in the change signal, and outputs the sound processing signal to the D/A converter 18*a*. As a result, a sound having a relatively small volume is output from the display panel speaker. Accordingly, it is possible to provide a sound having an appropriate volume to the passengers 72 in the second-row seats 63 and 64 who are relatively close to the display panel 30.

Subsequently, the control unit 13 reduces a gain of a sound signal to be output to the third-row seat speakers 51 and 52 among the vehicle speakers (S35). For example, the control unit 13 minimizes a gain of a sound to be output to the third-row seat speakers 51 and 52. Then, the control unit 13 generates a change signal including a value of the minimum gain for the third-row seat speakers 51 and 52, and outputs the change signal to the DSP 17.

As a result, the DSP 17 causes the gain adjustment circuit 17*a* to generate a sound processing signal by minimizing a gain of a sound signal based on the value of the gain for the third-row seat speakers 51 and 52 included in the change signal, and outputs the sound processing signal to the D/A converter 18*c*. As a result, almost no sound is output from the third-row seat speakers 51 and 52. Accordingly, even when the passengers 71 sit in the third-row seats 65 to 67, it is possible to prevent the passengers 71 from feeling uncomfortable caused by hearing a sound provided for the passengers 72 in the second-row seats 63 and 64.

Further, the control unit 13 increases a gain of a sound signal to be output to the second-row seat speakers 41 and 42 to be larger than a gain before the display panel 30 is rotated (S36). When an angle of the display panel 30 relative to the base 10 changes from the angle for the third-row seats 65 to 67 to an angle close to the angle for the second-row seats 63 and 64, the control unit 13 increases a gain of a sound signal to be output to the second-row seat speakers 41 and 42. In this case, an angle of the display panel 30 exceeds the angle for the third-row seats 65 to 67 as compared with an angle of the display panel 30 before the display panel 30 is rotated as described above, and the display panel 30 is opened to the angle for the second-row seats 63 and 64. Therefore, the control unit 13 increases a gain of a sound signal to be output to the second-row seat speakers 41 and 42 to be larger than a gain before the display panel 30 is rotated. Then, the control unit 13 generates a change signal including a value of a gain for the second-row seat speakers 41 and 42 corresponding to an angle of the display panel 30 after the display panel 30 is rotated, and outputs the change signal to the DSP 17.

As a result, the DSP 17 generates a sound processing signal by increasing a gain of a sound signal based on the value of the gain for the second-row seat speakers 41 and 42 included in the change signal, and outputs the sound processing signal to the D/A converter 18*b*. As a result, a sound having a relatively large volume is output from the second-row seat speakers 41 and 42. Accordingly, it is possible to provide a sound having an appropriate volume to the passengers 72 in the second-row seats 63 and 64.

Although only gain setting is changed in the sound setting change in S13 described above, the sound setting change is not limited thereto. In the present embodiment, setting of at least one of a gain, a phase, a delay amount, and a frequency characteristic of a sound signal may be changed. For example, setting of a delay amount may be changed in addition to the gain setting change. Accordingly, it is possible to provide a sound having more appropriate quality to the passengers 72 in the second-row seats 63 and 64 or the passengers 71 in the third-row seats 65 to 67. Alternatively, only setting of a delay amount may be changed.

Although an example has been described in which the display panel 30 is opened is two stages including a stage in which the display panel 30 is opened for the second-row seats 63 and 64 and a stage in which the display panel 30 is opened for the third-row seats 65 to 67, the present invention is not limited thereto. For example, a standard angle of the display panels 30 for the second-row seats 63 and 64 and a standard angle of the display panel 30 for the third-row seats 65 to 67 may be changed in a manner of corresponding to a physique larger or smaller than a physique (mainly, a height) of a standard passenger. In this case, an angle of the display panel 30 may be adjusted from the standard angle of the display panel 30 for the second-row seats 63 and 64 and the standard angle of the display panel 30 for the third-row seats 65 to 67 by an operation of a user via the operation unit 12. That is, the display panel 30 may be opened in three or more stages. Then, sound setting of a sound signal to be output to each of the display panel speaker and the vehicle speaker may be changed in accordance with an angle of the display panel 30 after the display panel 30 is rotated. Accordingly, it is possible to provide a sound having more appropriate quality to the passengers 72 in the second-row seats 63 and 64 or the passengers 71 in the third-row seats 65 to 67.

Effects of Embodiment

As described above, the in-vehicle sound display device 1 according to the present embodiment changes sound setting of a sound signal to be output to the display panel speaker (the display unit 31 and the actuator 32) in accordance with an angle of the display panel 30 detected by the angle sensor 33. Accordingly, since a sound having quality corresponding to an angle of the display panel 30 is output from the display panel speaker, an influence of an angle of the display panel 30 can be reduced, and a sound having appropriate quality can be provided to the passengers 71 and 72.

The in-vehicle sound display device 1 changes sound setting of a sound signal to be output to the vehicle speaker (the second-row seat speakers 41 and 42 and the third-row seat speakers 51 and 52) in accordance with an angle of the display panel 30 detected by the angle sensor 33. Accordingly, since a sound having quality corresponding to an angle of the display panel 30 is output from the vehicle speaker, an influence of an angle of the display panel 30 can be reduced, and a sound having appropriate quality can be provided to the passengers 71 and 72.

The sound setting is setting of at least one of a gain, a phase, a delay amount, and a frequency characteristic of a sound signal output from the display panel speaker or the vehicle speaker. Accordingly, for example, when the sound setting is setting of a gain, a sound having a gain (a volume) corresponding to an angle of the display panel 30 is output from the display panel speaker or the vehicle speaker. Therefore, it is possible to reduce an influence of an angle of the display panel 30 and provide the passengers 71 and 72 with a sound having an appropriate volume.

Further, at least one sound setting of a sound signal to be output to the display panel speaker or the vehicle speaker is different between a case where an angle of the display panel 30 is an angle for the second-row seats 63 and 64 and a case where an angle of the display panel 30 is an angle for the third-row seats 65 to 67. Here, the angle for the second-row seats 63 and 64 is an angle (for example, 90°+20°) at which the display panel 30 directly faces the heads of the passengers 72 in the second-row seats 63 and 64. Further, the angle for the third-row seats 65 to 67 is an angle (for example, 90°) at which the display panel 30 directly faces the heads of the passengers 71 in the third-row seats 65 to 67. The at least one sound setting is setting of at least one of a gain, a phase, a delay amount, and a frequency characteristic. Accordingly, for example, when the sound setting is setting of a gain, it is possible to provide a sound having an appropriate volume to the passengers 72 in the second-row seats 63 and 64 and the passengers 71 in the third-row seats 65 to 67.

Specifically, when an angle of the display panel 30 relative to the base 10 detected by the angle sensor 33 is close to the angle for the third-row seats 65 to 67, a gain of a sound signal to be output to the display panel speaker is increased. Accordingly, since a sound having a relatively large volume is output from the display panel speaker, it is possible to provide a sound having an appropriate volume to the passengers 71 in the third-row seats 65 to 67 who are relatively far from the display panel 30.

When an angle of the display panel 30 changes from the angle for the third-row seats 65 to 67 to an angle close to the angle for the second-mw seats 63 and 64, a gain of a sound signal to be output to the display panel speaker is reduced. Accordingly, although a sound volume is smaller than a sound volume when an angle of the display panel 30 is an angle (for example, 90°) at which the display panel 30 directly faces the heads of the passengers 71 in the third-row seats 65 to 67, since a sound having a relatively large volume is output from the display panel speaker, it is possible to provide a sound having an appropriate volume to the passengers 72 in the second-row seats 63 and 64 who are relatively close to the display panel 30.

When an angle of the display panel 30 is close to the angle for the third-row seats 65 to 67, a gain of a sound signal to be output to the third-row seat speakers 51 and 52 among the vehicle speakers is increased. Accordingly, since a sound having a relatively large volume is output from the third-row seat speakers 51 and 52, it is possible to provide a sound having an appropriate volume to the passengers 71 in the third-row seats 65 to 67.

When an angle of the display panel 30 changes from the angle for the third-row seats 65 to 67 to an angle close to the angle for the second-row seats 63 and 64, a gain of a sound signal to be output to the second-row seat speakers 41 and 42 is increased. Accordingly, since a sound having a relatively large volume is output from the second-row seat speakers 41 and 42, it is possible to provide a sound having an appropriate volume to the passengers 72 in the second-row seats 63 and 64.

<Modification>

In the embodiment described above, a case where a support shaft for opening and closing the display panel 30 is provided at a front side of the vehicle 60 in the base 10 has been described. That is, a display device in which the display surface 31*a* of the display unit 31 faces the ceiling of the vehicle 60 in a state in which the display panel 30 is closed and the display surface 31*a* faces a passenger in a rear seat of the vehicle 60 in a state in which the display panel 30 is opened has been described. In this display device, when the display panel 30 is opened, an angle of the display panel 30 first becomes an angle (for example, 90°) for the third-row seats 65 to 67, and then becomes an angle (for example, 90°+20°) for the second-row seats 63 and 64. However, a configuration and an operation of the display device are not limited thereto.

For example, a case where a support shaft for opening and closing the display panel 30 is provided at a rear side of the vehicle 60 in the base 10 will be described below. That is, the display device may be a display device in which the display surface 31*a* of the display unit 31 faces the floor of the vehicle 60 in a state in which the display panel 30 is closed and the display surface 31*a* faces a passenger in a rear seat of the vehicle 60 in a state in which the display panel 30 is opened. When the display panel 30 is opened, an angle of the display panel 30 may first become an angle (for example, 90°-20°) for the second-row seats 63 and 64, and then become an angle (for example, 90°) for the third-row seats 65 to 67. In the case of such a display device, sound setting of a sound signal to be output to each of the display panel speaker and the vehicle speaker may be changed in accordance with an angle of the display panel 30 detected by the angle sensor 33.

For example, an appropriate value of the sound setting stored in the auxiliary storage unit 14, an appropriate value of a gain may be set as follows. That is, when an angle of the display panel 30 relative to the base 10 is close to the angle for the second-row seats 63 and 64, a gain of a sound signal to be output to the display panel speaker may be increased. Further, when angle of the display panel 30 changes from the angle for the second-row seats 63 and 64 to an angle close to the angle for the third-row seats 65 to 67, a gain of a sound signal to be output to the display panel speaker may be increased. When an angle of the display panel 30 is close to the angle for the second-row seats 63 and 64, a value of a gain of a sound signal to be output to the second-row seat speakers 41 and 42 may be increased. Further, when an angle of the display panel 30 changes from the angle for the second-row seats 63 and 64 to an angle close to the angle for the third-row seats 65 to 67, a value of a gain of a sound signal to be output to the third-row seat speakers 51 and 52 may be increased. Here, the angle for the second-row seats 63 and 64 is an angle (for example, 90°-20°) at which the display panel 30 directly faces the heads of the passengers 72 in the second-row seats 63 and 64. Further, the angle for the third-row seats 65 to 67 is an angle (for example, 90°) at which the display panel 30 directly faces the heads of the passengers 71 in the third-row seats 65 to 67.

Then, the control unit 13 may use the appropriate value of the gain stored in the auxiliary storage unit 14 to change a gain of a sound signal to be output to each of the display panel speaker and the vehicle speaker in accordance with an angle of the display panel 30 relative to the base 10 detected by the angle sensor 33.

Specifically, the control unit 13 may increase a gain of a sound signal to be output to the display panel speaker when an angle of the display panel 30 is close to the angle for the second-row seats 63 and 64. As a result, a sound having a relatively large volume is output from the display panel speaker. Accordingly, it is possible to provide a sound having an appropriate volume to the passengers 72 in the second-row seats 63 and 64 who are relatively close to the display panel 30. Further, the control unit 13 may increase a gain of a sound signal to be output to the display panel speaker when an angle of the display panel 30 changes from the angle for the second-row seats 63 and 64 to an angle close to the angle for the third-row seats 65 to 67. As a result, a sound having a volume larger than a volume in a case where an angle of the display panel 30 is the angle for the second-row seats 63 and 64 is output from the display panel speaker. Accordingly, it is possible to provide a sound having an appropriate volume to the passengers 71 in the third-row seats 65 to 67 who are relatively far from the display panel 30.

In addition, the control unit 13 may increase a gain of a sound signal output to the second-row seat speakers 41 and 42 when an angle of the display panel 30 is close to the angle for the second-row seats 63 and 64. As a result, a sound having a relatively large volume is output from the second-row seat speakers 41 and 42. Accordingly, it is possible to provide a sound having an appropriate volume to the passengers 72 in the second-row seats 63 and 64.

Further, the control unit 13 may increase a gain of a sound signal to be output to the third-row seat speakers 51 and 52 when an angle of the display panel 30 changes from the angle for the second-row seats 63 and 64 to an angle close to the angle for the third-row seats 65 to 67. As a result, a sound having a relatively large volume is output from the third-row seat speakers 51 and 52. Accordingly, it is possible to provide a sound having an appropriate volume to the passengers 71 in the third-row seats 65 to 67.

In the embodiment described above, a case where the auxiliary storage unit 14 stores a table in which an appropriate value of sound setting for a pattern of a change in an angle of the display panel 30 is tabulated has been described. However, a configuration of the table stored in the auxiliary storage unit 14 is not limited thereto. For example, the auxiliary storage unit 14 may store a table in which an appropriate value of sound setting for a predetermined angle range of the display panel 30 is tabulated. Table 1 below shows an example of a configuration of a table in which an appropriate value of a gain for a predetermined angle range of the display panel 30 relative to the base 10 is tabulated for each of the display panel speaker and the vehicle speaker. Here, it is assumed that the support shaft for opening and closing the display panel 30 is provided at a front side of the vehicle 60 in the base 10, and the display surface 31*a* of the display unit 31 faces the ceiling of the vehicle 60 in a state in which the display panel 30 is closed. However, when the support shaft for opening and closing the display panel 30 is provided at a rear side of the vehicle 60 in the base 10, an angle range is different, but sound setting can be made using the same table as a Table 1. In Table 1, among predetermined angle ranges, for example, an angle range from 80° to 100° is assumed to be an angle range for the passengers 71 in the third-row seats 65 to 67. Further, an angle range from 100° to 130° is assumed to be an angle range for the passengers 72 in the second-row seats 63 and 64. Furthermore, an angle range from 130° to 150° is assumed to be an angle range for child passengers 72 in the second-row seats 63 and 64.

TABLE 1

| | Gain (correction amount for master volume) | | |
|---|---|---|---|
| Angle (°) | Display panel speaker | Second-row seat speaker | Third-row seat speaker |
| 0-30 | No sound (mute) | Large volume (−0 dB) | Large volume (−0 dB) |
| 30-80 | Small volume (−20 dB) | Large volume (−0 dB) | Large volume (−0 dB) |
| 80-100 | Large volume (−0 dB) | Small volume (−20 dB) | Large volume (−0 dB) |
| 100-130 | Medium volume (−10 dB) | Large volume (−0 dB) | Small volume (−20 dB) |
| 130-150 | Small volume (−20 dB) | Large volume (−0 dB) | Large volume (−0 dB) |
| 150-180 | No sound (mute) | Large volume (−0 dB) | Large volume (−0 dB) |

The display panel 30 is rotated from a closed state relative to the base 10 to a posture designated by a user by an operation of the user related to a posture of the display panel 30 via the operation unit 12. In this case, after the control unit 13 detects that the rotation of the display panel 30 is stopped, the control unit 13 receives a detection signal from the angle sensor 33 and detects an angle of the display panel 30 relative to the base 10. Subsequently, the control unit 13 may use a table indicated by Table 1 to change a value of a gain to an appropriate value of a gain corresponding to an angle range including the detected angle of the display panel 30. Then, the control unit 13 may generate a change signal including an appropriate value of a gain corresponding to an angle range including the detected angle of the display panel 30 and output the change signal to the DSP 17.

For example, when the detected angle of the display panel 30 is 85°, the control unit 13 may change a value of a gain to an appropriate value of a gain corresponding to an angle range from 80° to 100° shown in Table 1. That is, the control unit 13 may change a value of a gain to a "large volume" for the display panel speaker. As a result, a sound having a relatively large volume is output from the display panel speaker, and thus it is possible to provide a sound having an appropriate volume to the passengers 71 in the third-row seats 65 to 67 who are relatively far from the display panel 30. Further, the control unit 13 may change a value of a gain to a "large volume" for the third-row seat speakers 51 and 52. As a result, a sound having a relatively large volume is output from the third-row seat speakers 5 and 52, and thus it is possible to provide a sound having an appropriate volume to the passengers 71 in the third-row seats 65 to 67. Further, the control unit 13 may change a value of a gain to a "small volume" for the second-row seat speakers 41 and 42. As a result, a sound having a relatively small volume is output from the second-row seat speakers 41 and 42. Accordingly, even when the passengers 72 sit in the second-row seats 63 and 64, it is possible to prevent the passengers 72 from feeling uncomfortable caused by hearing a sound provided for the passengers 71 in the third-row seats 65 to 67.

Table 2 below shows an example of a configuration of a table in which an appropriate value of a delay amount and an appropriate value of a frequency characteristic relative to a predetermined angle range of the display panel 30 are tabulated for the display panel speaker.

TABLE 2

| | Setting value of display panel speaker (correction amount from master setting value) | |
|---|---|---|
| Angle (°) | Delay amount (ms) | Frequency characteristic |
| 0-30 | No setting | No setting |
| 30-80 | ±0 | No correction |
| 80-100 | −1 | Range of 300 Hz to 3 kHz + 3 dB |
| 100-130- | ±0 | No correction |
| 130-150 | ±0 | No correction |
| 150-180 | No setting | No correction |

As described above, after the control unit 13 detects that the rotation of the display panel 30 is stopped, the control unit 13 receives a detection signal from the angle sensor 33 and detects an angle of the display panel 30 relative to the base 10. Subsequently, the control unit 13 may use a table indicated by Table 2 to change a value of the delay amount and a value of the frequency characteristic to an appropriate value of the delay amount and an appropriate value of the frequency characteristic corresponding to an angle range including the detected angle of the display panel 30. Then, the control unit 13 may generate a change signal including the appropriate value of the delay amount and the appropriate value of the frequency characteristic corresponding to an angle range including the detected angle of the display panel 30 and output the change signal to the DSP 17.

For example, when the detected angle of the display panel 30 is 85°, the delay amount may be changed to an appropriate value of the delay amount corresponding to an angle range from 80° to 100° shown in Table 2, that is, "−1". As a result, a sound output from the display panel speaker reaches the passengers 71 in the third-row seats 65 to 67 at the same time as a sound output from the third-row seat speakers 51 and 52 or reaches the passengers 71 at a time slightly earlier than the sound output from the third-row seat speakers 51 and 52. Accordingly, a sound image is localized toward the display panel 30 by a preceding sound effect of the sound output from the display panel speaker, and thus an appropriate sound can be provided to the passengers 71 in the third-row seats 65 to 67. Further, the delay amount may be changed to an appropriate value of the frequency characteristic corresponding to an angle range from 80° to 100°, that is, a range of "300 Hz to 3 kHz" may be changed to +3 dB. As a result, in a sound output from the display panel speaker, a band in which the sound is easily attenuated, that is, a band from 300 Hz to 3 kHz becomes slightly strong, so that the sound output from the display panel speaker clearly reaches the passengers 71 in the third-row seats 65 to 67. Accordingly, an appropriate sound can be provided to the passengers 71 in the third-row seats 65 to 67.

In Table 2, appropriate values of delay amounts corresponding to an angle range from 100° to 130° and an angle range from 130° to 150° that are assumed to be angle ranges for the passengers 72 in the second-row seats 63 and 64 are "±0 ms". However, the appropriate values of delay amounts corresponding to these angle ranges may also be set for the passengers 72 in the second-row seats 63 and 64 in consideration of a preceding sound effect. Appropriate values of frequency characteristics corresponding to the angle range from 100° to 130° and the angle range from 130° to 150° are "no correction". However, the appropriate values of the frequency characteristics corresponding to these angle ranges may also be set for the passengers 72 in the second-row seats 63 and 64 in consideration of clarity of a sound.

An appropriate value of a phase corresponding to a predetermined angle range is not set in Table 2. However, an appropriate value of a phase for each predetermined angle range may be set in a table such as Table 2 so that a sound output from the display panel speaker reaches the passengers 72 in the second-row seats 63 and 64 and the passengers 71 in the third-row seats 65 to 67 with an ideal impulse characteristic.

Although a case where the in-vehicle sound display device 1 includes both the display panel speaker and the vehicle speaker has been described in the above embodiment, a configuration of a speaker of the in-vehicle sound display device 1 is not limited thereto. For example, the in-vehicle sound display device 1 may include the display panel speaker only. In this case, the auxiliary storage unit 14 may store only a table in which an appropriate value of sound setting for an angle of the display panel 30 is tabulated for the display panel speaker. In addition, the in-vehicle sound display device 1 may include the vehicle speaker only. In this case, the auxiliary storage unit 14 may store only a table in which an appropriate value of sound setting for an angle of the display panel 30 is tabulated for the vehicle speaker (the second-row seat speakers 41 and 42 and the third-row seat speakers 51 and 52).

Although a case where the display panel 30 rotates in the y-z plane has been described in the above embodiment, a rotation direction of the display panel 30 is not limited thereto. For example, the base 10 may further include another rotation mechanism in addition to the rotation mechanism 20, so that the display panel 30 may further rotate in a x-y plane in addition to the y-z plane. In this case, in addition to an angle in the y-z plane, the auxiliary storage unit 14 may store a table in which an appropriate value of sound setting for an angle of the display panel 30 for each predetermined angle of the display panel 30 is tabulated for an angle in the x-y plane.

Although a case where the display panel 30 is driven and rotated by the rotation mechanism 20 has been described in the above embodiment, a drive unit for rotating the display panel 30 is not limited thereto. For example, the display panel 30 may be manually rotated. Even in this case, sound setting of a sound signal to be output to the display panel speaker may be changed in accordance with an angle of the display panel 30 detected by the angle sensor 33 by using a table that is stored in the auxiliary storage unit 14 and in which an appropriate value of sound setting for an angle of the display panel 30 is tabulated.

Although the display panel speaker includes the display unit 31 and the actuator 32 in the above embodiment, the configuration of the display panel speaker is not limited thereto. For example, instead of the display unit 31 and the actuator 32, a speaker such as a vehicle speaker may be provided on the display surface 31*a* of the display panel 30. Instead of the display surface 31*a*, a speaker such as a vehicle speaker may be provided on a surface of the display panel 30 opposite to the display surface 31*a*. Alternatively, a speaker such as a vehicle speaker may be provided on a side surface of the display panel 30.

Although a case where the in-vehicle sound display device 1 includes a foldable display device of a ceiling-suspended type that is installed at the ceiling portion in the vehicle cabin has been described in the above embodiment, a form of the display device included in the in-vehicle sound display device 1 is not limited thereto. For example, the in-vehicle sound display device 1 may include a retractable display device of a headrest attachable type that is installed at a headrest of the first-row seats 61 and 62 or the second-row seats 63 and 64.

What is claimed is:

1. A sound control apparatus comprising:

a display panel provided in a vehicle including at least a first-row seat, a second-row seat, and a third-row seat, the display panel being provided in a manner in which an angle of the display panel is variable;

an angle detector configured to detect the angle of the display panel;

a first speaker that is provided at the display panel; and a controller configured to change setting of at least one of a gain, a phase, a delay amount, and a frequency characteristic of a sound signal to be output to the first speaker in accordance with the angle of the display panel in relation to a position of a head of a passenger in at least one of the second-row seat and the third-row seat, wherein the controller performs a control so that at least one of the gain, the phase, the delay amount, and the frequency characteristic of the sound signal to be output to the first speaker is different between (i) a case where the angle of the display panel is a first angle at which a normal direction of the display panel faces toward the position of the head of the passenger in the second-row seat and (ii) a case where the angle of the display panel is a second angle at which the normal direction of the display panel faces toward the position of the head of the passenger in the third-row seat.

2. The sound control apparatus according to claim 1, wherein:

the controller performs a control so that at least one of the gain, the phase, the delay amount, and the frequency characteristic of the sound signal to be output to the first speaker is different between (i) the case where the angle of the display panel is the first angle at which the normal direction of the display panel faces toward the position of the head of the passenger in the second-row seat, (ii) the case where the angle of the display panel is the second angle at which the normal direction of the display panel faces toward the position of the head of the passenger in the third-row seat, and (iii) a case where the angle of the display panel is neither the first angle nor the second angle.

3. A sound control apparatus comprising:

a display panel provided in a vehicle including at least a first-row seat, a second-row seat, and a third-row seat, the display panel being provided in a manner in which an angle of the display panel is variable;

an angle detector configured to detect the angle of the display panel;

a first speaker that is provided at the display panel;

a controller configured to change setting of at least one of a gain, a phase, a delay amount, and a frequency characteristic of a sound signal to be output to the first speaker in accordance with the angle of the display panel in relation to a position of a head of a passenger in at least one of the second-row seat and the third-row seat; and a second speaker that is provided in the vehicle and that is different from the first speaker, wherein the controller performs control so that at least one of the gain, the phase, the delay amount, and the frequency characteristic of the sound signal to be output to the first speaker or the second speaker is different between (1) a case where the angle of the display panel is a first angle at which a normal direction of the display panel faces toward the position of the head of the passenger in the second-row seat and (2) a case where the angle of the display panel is a second angle at which the normal direction of the display panel faces toward the head of the passenger in the third-row seat.

4. The sound control apparatus according to claim 3, wherein the controller increases the gain of the sound signal to be output to the first speaker when the angle of the display panel is close to the second angle at which the normal direction of the display panel faces toward the position of the head of the passenger in the third-row seat.

5. The sound control apparatus according to claim 4, wherein the controller reduces the gain of the sound signal to be output to the first speaker when the angle of the display panel changes from the second angle at which the normal direction of the display panel faces toward the position of the head of the passenger in the third-row seat to an angle close to the first angle at which the normal direction of the display panel faces toward the position of the head of the passenger in the second-row seat.

6. The sound control apparatus according to claim 3, wherein the second speaker is provided in a vicinity of the third-row seat of the vehicle, and the controller increases the gain of the sound signal to be output to the second speaker when the angle of the display panel is close to the second angle at which the normal direction of the display panel faces toward the position of the head of the passenger in the third-row seat.

7. The sound control apparatus according to claim 3, wherein the second speaker is provided in a vicinity of the second-row seat of the vehicle, and the controller increases the gain of the sound signal to be output to the second speaker when the angle of the display panel changes from the second angle at which the normal direction of the display panel faces toward the position of the head of the passenger in the third-row seat to an angle close to the first angle at which the normal direction of the display panel faces toward the position of the head of the passenger in the second-row seat.

8. A sound control method for changing sound setting in a cabin of a vehicle including at least a first-row seat, a second-row seat and a third-row seat, the sound control method comprising:

detecting an angle of a display panel, the display panel being provided in a manner in which the angle of the display panel is variable; and changing, by a controller, setting of at least one of a gain, a phase, a delay amount, and a frequency characteristic of a sound signal to be output to a first speaker that is provided at the display panel in accordance with the angle of the display panel in relation to a position of a head of a passenger in at least one of the second-row seat and the third-row seat, wherein the changing of the setting performed by the controller includes a control so that at least one of the gain, the phase, the delay amount, and the frequency characteristic of the sound signal to be output to the first speaker is different between (i) a case where the angle of the display panel is a first angle at which a normal direction of the display panel faces toward the position of the head of the passenger in the second-row seat and (ii) a case where the angle of the display panel is a second angle at which the normal direction of the display panel faces toward the position of the head of the passenger in the third-row seat.

9. A sound control apparatus comprising:

a controller configured to acquire, from a display panel that is (i) provided in a vehicle including at least a first-row seat, a second-row seat, and a third-row seat and (ii) provided in a manner in which an angle of the display panel is variable, information indicating the angle of the display panel; and change setting of at least one of a gain, a phase, a delay amount, and a frequency characteristic of a sound signal to be output to a speaker provided at the display panel in accordance with the angle of the display panel in relation to a position of a head of a passenger in at least one of the second-row seat and the third-row seat, wherein the controller performs a control so that at least one of the gain, the phase, the delay amount, and the frequency characteristic of the sound signal to be output to the speaker is different between (i) a case where the angle of the display panel is a first angle at which a normal direction of the display panel faces toward the position of the head of the passenger in the second-row seat and (ii) a case where the angle of the display panel is a second angle at which the normal direction of the display panel faces toward the position of the head of the passenger in the third-row seat.

10. The sound control apparatus according to claim 9, wherein:

the controller performs a control so that at least one of the gain, the phase, the delay amount, and the frequency characteristic of the sound signal to be output to the speaker is different between (i) the case where the angle of the display panel is the first angle at which the normal direction of the display panel faces toward the position of the head of the passenger in the second-row seat, (ii) the case where the angle of the display panel is the second angle at which the normal direction of the display panel faces toward the position of the head of the passenger in the third-row seat, and (iii) a case where the angle of the display panel is neither the first angle nor the second angle.

11. A sound control method for changing sound setting in a cabin of a vehicle including at least a first-row seat, a second-row seat, and a third-row seat, the sound control method comprising:

acquiring, from a display panel provided in the vehicle in a manner in which an angle of the display panel is variable, information indicating the angle of the display panel; and changing setting of at least one of a gain, a phase, a delay amount, and a frequency characteristic of a sound signal to be output to a speaker provided at the display panel in accordance with the angle of the display panel in relation to a position of a head of a passenger in at least one of the second-row seat and the third-row seat, wherein the changing of the setting includes a control so that at least one of the gain, the phase, the delay amount, and the frequency characteristic of the sound signal to be output to the speaker is different between (i) a case where the angle of the display panel is a first angle at which a normal direction of the display panel faces toward the position of the head of the passenger in the second-row seat and (ii) a case where the angle of the display panel is a second angle at which the normal direction of the display panel faces toward the position of the head of the passenger in the third-row seat.

* * * * *